(12) United States Patent
Adeyshvili et al.

(10) Patent No.: US 10,795,154 B2
(45) Date of Patent: Oct. 6, 2020

(54) HEAD-UP DISPLAY

(71) Applicants: DENSO International America, Inc., Southfield, MI (US); DENSO CORPORATION, Kariya, Aichi-pref. (JP)

(72) Inventors: Olga Adeyshvili, Novi, MI (US); Reben Werman, Sterling Heights, MI (US); Kelly Farner, West Bloomfield, MI (US)

(73) Assignees: DENSO International America, Inc., Southfield, MI (US); DENSO CORPORATION, Kariya, Aichi-pref. (JP)

(*) Notice: Subject to any disclaimer, the term of this patent is extended or adjusted under 35 U.S.C. 154(b) by 0 days.

(21) Appl. No.: 16/123,754

(22) Filed: Sep. 6, 2018

(65) Prior Publication Data

US 2019/0265469 A1   Aug. 29, 2019

Related U.S. Application Data

(60) Provisional application No. 62/634,417, filed on Feb. 23, 2018.

(51) Int. Cl.
*F21V 13/00* (2006.01)
*G02B 27/01* (2006.01)
(Continued)

(52) U.S. Cl.
CPC ....... *G02B 27/0101* (2013.01); *G02B 3/0037* (2013.01); *G02B 3/08* (2013.01); *G02F 1/133603* (2013.01); *G02F 1/133606* (2013.01); *F21V 5/007* (2013.01); *F21V 13/04* (2013.01); *G02F 2001/133607* (2013.01)

(58) Field of Classification Search
CPC . F21V 5/007; F21V 5/04; F21V 13/04; F21V 13/12; G02B 27/0101; G02B 3/08; G02B 3/0037; G02B 2027/0118; G02B 3/005; G02B 3/0056; G02F 1/133603; G02F 1/133606; G02F 1/1368; G02F 2001/133607
See application file for complete search history.

(56) References Cited

U.S. PATENT DOCUMENTS 8,591,074 B1    11/2013  Jiang et al.
2003/0202241 A1*  10/2003  Blumel .................. F21V 5/007
                                                              359/365

(Continued)

FOREIGN PATENT DOCUMENTS

CN    203586085 U     5/2014
JP    2005338680 A    12/2005
(Continued)

*Primary Examiner* — Y M. Quach Lee
(74) *Attorney, Agent, or Firm* — Harness, Dickey & Pierce, P.L.C.

(57) ABSTRACT

A head-up display assembly including a printed circuit board having a plurality of light emitting elements. A display element is illuminated by the plurality of light emitting elements. A total internal reflection (TIR) lens array includes a plurality of TIR lenses. Each one of the plurality of TIR lenses is aligned with a different one of the plurality of light emitting elements to reflect light emitted by the plurality of light emitting elements to the display element to illuminate the display element.

14 Claims, 2 Drawing Sheets

(51) Int. Cl.
*G02B 3/00* (2006.01)
*G02B 3/08* (2006.01)
*G02F 1/13357* (2006.01)
*F21V 5/00* (2018.01)
*F21V 13/04* (2006.01)

(56) References Cited

U.S. PATENT DOCUMENTS

| | | |
|---|---|---|
| 2004/0223330 A1 | 11/2004 | Broude et al. |
| 2008/0043466 A1* | 2/2008 | Chakmakjian ........... F21V 5/007 362/237 |
| 2008/0304164 A1 | 12/2008 | Chao et al. |
| 2013/0223081 A1* | 8/2013 | Jiang ......................... F21V 5/04 362/327 |
| 2015/0049463 A1 | 2/2015 | Wang He et al. |
| 2016/0139408 A1 | 5/2016 | Yagi |
| 2016/0334075 A1 | 11/2016 | Nambara |
| 2017/0299922 A1* | 10/2017 | Matsuura ........... G02F 1/133603 |
| 2017/0329133 A1 | 11/2017 | Nambara |
| 2017/0329181 A1 | 11/2017 | Pierre |
| 2019/0171010 A1 | 6/2019 | Nambara |

FOREIGN PATENT DOCUMENTS

| | | |
|---|---|---|
| JP | 2013115079 A | 6/2013 |
| JP | 2014067023 A | 4/2014 |
| JP | 2015232943 A | 12/2015 |
| WO | WO-2018030023 A1 | 2/2018 |

* cited by examiner

HEAD-UP DISPLAY

CROSS-REFERENCE TO RELATED APPLICATIONS

This application claims the benefit of U.S. Provisional Application No. 62/634,417, filed on Feb. 23, 2018. The entire disclosure of the above application is incorporated herein by reference.

FIELD

The present disclosure relates to a head-up display, such as for a vehicle.

BACKGROUND

This section provides background information related to the present disclosure, which is not necessarily prior art.

Typical backlighting designs for vehicle head-up displays often include two or three optical elements, such as a first element to collect light from LEDs, a second element to collimate the light beam, and a third element to diffuse and/or redistribute energy from the center to the left and right eyebox position. While current head-up display backlighting designs are suitable for their intended use, they are subject to improvement. For example, current designs are unable to provide a desired luminance uniformity on the eyebox. The present disclosure advantageously provides for a head-up display assembly that maximizes luminance intensity on the eyebox, and fulfills industry requirements for luminance uniformity, as well as flexibility to adjust luminance intensity to the right and left eyebox position, all with only a single optical element. The present disclosure provides for numerous additional advantages as explained in detail herein, and as one skilled in the art will appreciate.

SUMMARY

This section provides a general summary of the disclosure, and is not a comprehensive disclosure of its full scope or all of its features.

The present disclosure includes a head-up display assembly. The head-up display assembly includes a printed circuit board having a plurality of light emitting elements. A display element is illuminated by the plurality of light emitting elements. A total internal reflection (TIR) lens array includes a plurality of TIR lenses. Each one of the plurality of TIR lenses is aligned with a different one of the plurality of light emitting elements to reflect and refract light emitted by the plurality of light emitting elements to the display element to illuminate the display element.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
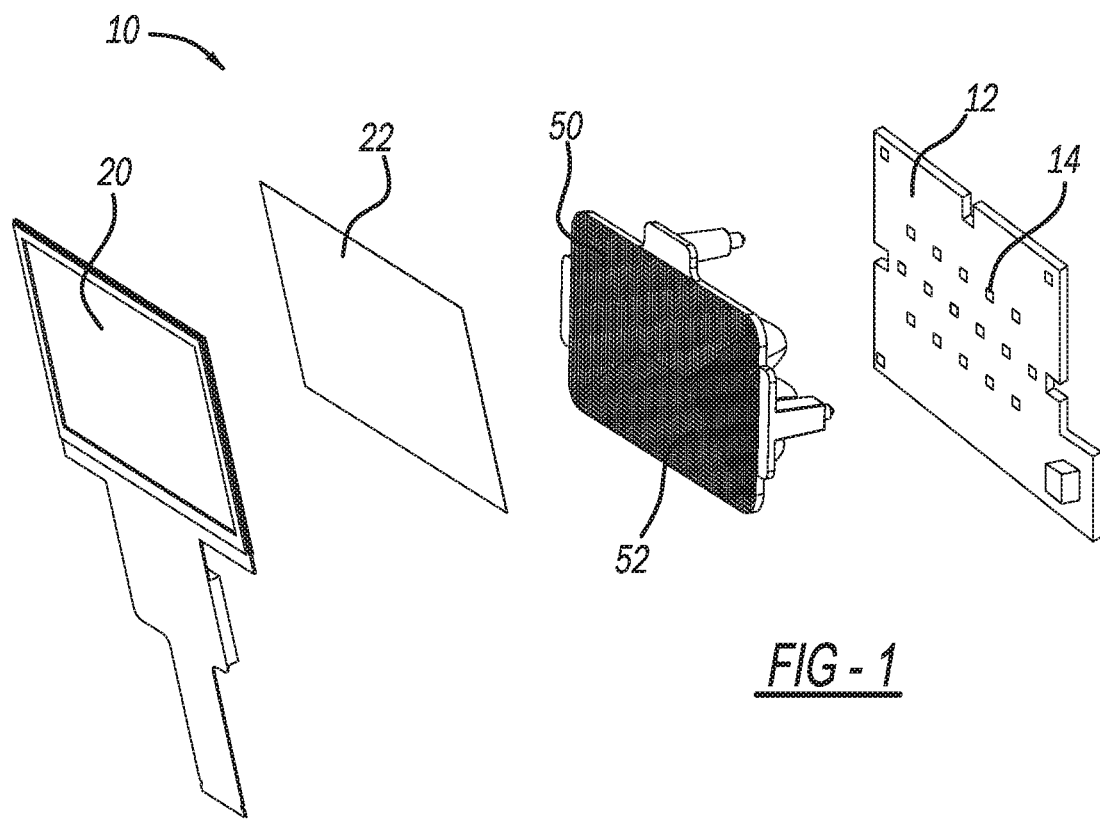
FIG. 1 is an exploded view of a head-up display assembly in accordance with the present disclosure.

With initial reference to FIG. 1, a head-up display (HUD) assembly in accordance with the present disclosure is generally illustrated at reference numeral 10. The HUD assembly 10 includes a printed circuit board (PCB) 12 having a plurality of light emitting elements. Any suitable light emitting elements can be included, such as light emitting diodes (LED) 14. The LEDs 14 illuminate a display element 20. The display element 20 may be any suitable display, such as a liquid-crystal display. Any suitable liquid-crystal display may be included, such as a thin-film-transistor liquid-crystal display. Light from the LEDs 14 is directed to the display element 20 by a total internal reflection (TIR) lens array 50 in accordance with the present disclosure. Any suitable light diffuser 22 may be arranged between the TIR lens array 50 and the display element 20.

The HUD assembly 10 may be configured for use with any suitable vehicular or non-vehicular application to convey information to a user. With respect to vehicular applications, the HUD assembly 10 may be configured to display information in a driver's line of sight to enhance safe operation of the vehicle. Any suitable information may be displayed by the HUD assembly 10, such as, but not limited to, the following: current vehicle speed; road speed limit; engine speed limit; navigational commands; vehicle heading; and entertainment system information (e.g., current radio station, selected podcast, etc.). The head-up display assembly 10 may also be adapted for use in any suitable non-vehicular application, such as aircraft applications, watercraft applications, military applications, etc.

Figure 2:
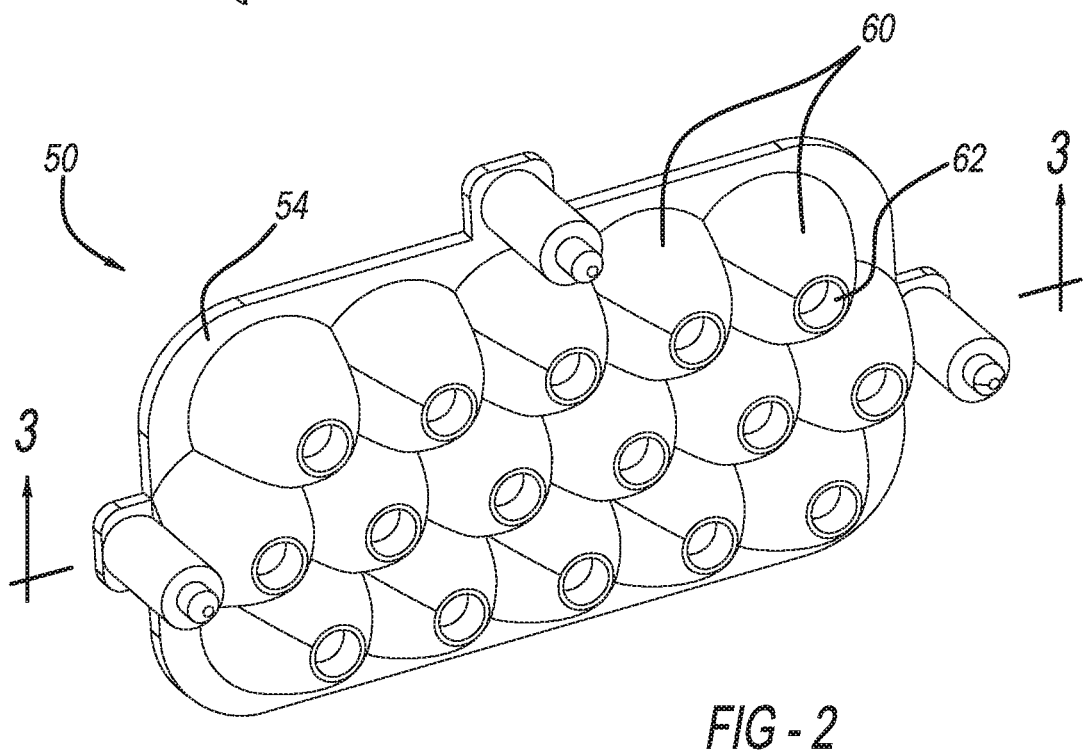
FIG. 2 is a perspective view of a lens array of the head-up display assembly of FIG. 1.
Figure 3:
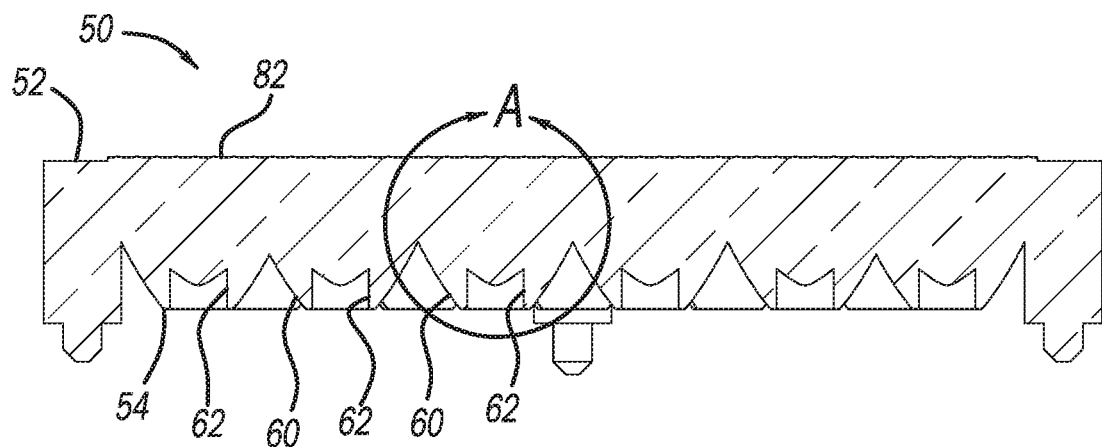
FIG. 3 is a cross-sectional view taken along line 3-3 of FIG. 2.

With continued reference to FIG. 1, and additional reference to FIGS. 2-4, the TIR lens array 50 will now be described in additional detail. The TIR lens array 50 has a front side 52 (see FIGS. 1 and 3, for example) and a rear side 54 (see FIGS. 2 and 3). The TIR lens array 50 includes a plurality of TIR lenses 60. Any suitable number of TIR lenses 60 may be included, such as one TIR lens for each LED 14. Each one of the TIR lenses 60 defines a light input aperture 62. The TIR lens array 50 is arranged over the PCB 12 such that each light input aperture 62 is aligned with one of the LEDs 14 (see FIG. 4, which illustrates alignment between a TIR lens 60 and an LED 14).

Figure 4:
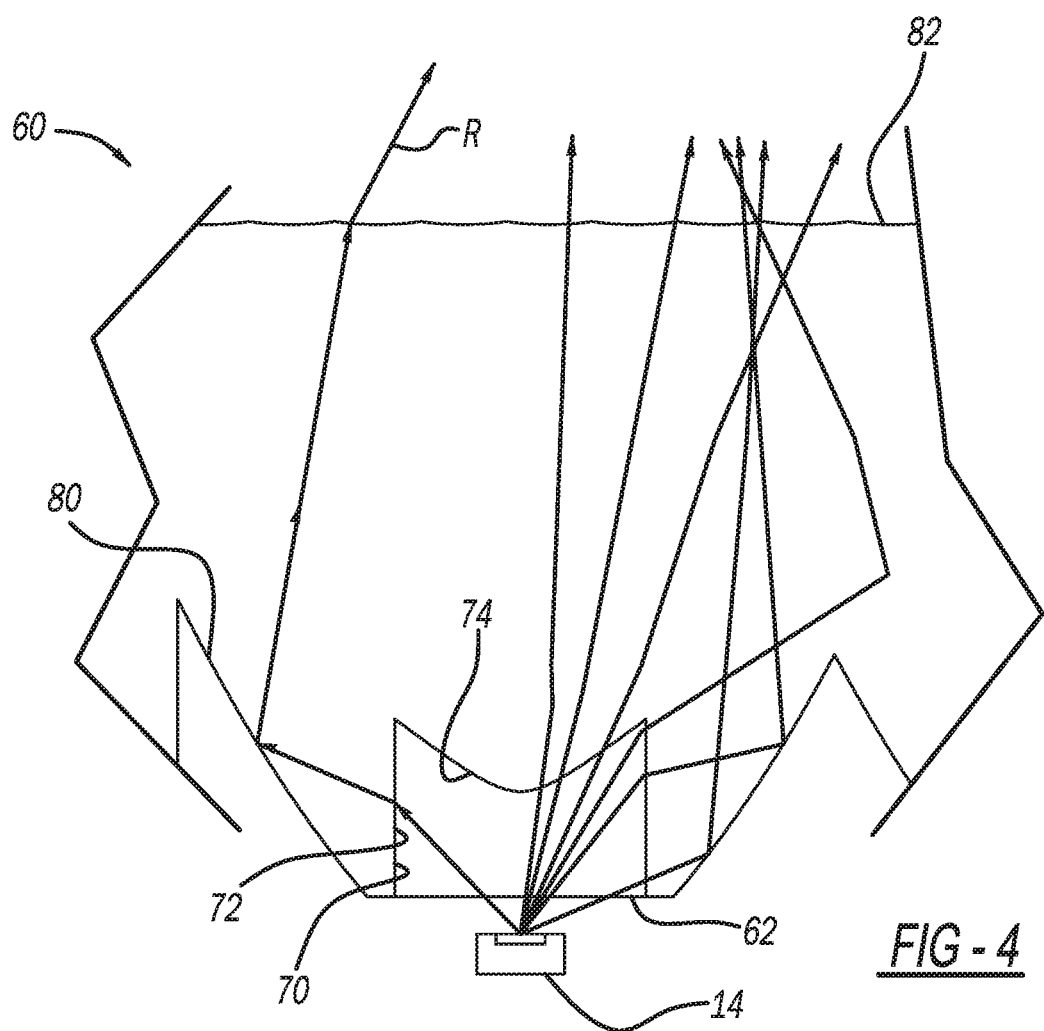
FIG. 4 is close-up view of area A of FIG. 3.

With reference to FIG. 4, for example, each TIR lens 60 has a first light transmission plane 70 at the light input aperture 62. The first light transmission plane 70 includes sidewalls 72 and a curved surface (or curved lens) 74, which is convex relative to the direction of the PCB 12. Surrounding the sidewalls 72 is a refractive plane 80. The refractive plane 80 extends about the sidewalls 72 to provide the TIR lens 60 as a teacup form lens.

Opposite to the light input aperture 62 is a second light transmission plane 82 at the front side 52, which can be a negative lenslet. The second light transmission plane 82 may include any suitable material extending across the front side 52 of the TIR lens array 50. The second light transmission plane 82 may include any suitable grooves, textures, and/or concave/convex surfaces for further removing hotspots and making the light beam passing therethrough more homogenous.

As illustrated in FIG. 4, as light from the LED 14 passes through the sidewall 72 of the first light transmission plane 70, the light reflects off of the refractive plane 80 and is directed to and through the second light transmission plane 82 without scattering. Light from the LED 14 that passes to the curved surface 74 passes through the curved surface 74 and is directed straight out of the TIR lens 60 through the second light transmission plane 82.

Each one of the TIR lens 60 advantageously collects and collimates (focuses, defocuses) light from the LED 14, which allows for a more effective diffuser 22 to be used to achieve luminance uniformity. Because a single TIR lens 60 is able to collect, collimate, and redistribute homogenous light, the present disclosure advantageously provides cost savings over existing head-up display assemblies requiring multiple components to each one of collect, collimate, diffuse and/or redistribute light from the center to the left and right eyebox position. Furthermore, because the TIR lens array 50 maximizes light intensity, the number of LEDs 14 can be reduced as to compared to existing assemblies, thus resulting in energy savings. Furthermore, the TIR lens array 50 has a relatively small thickness as compared to existing assemblies, which advantageously results in a height reduction. The one-piece TIR lens 60 also advantageously requires less time to manufacture as compared to exiting assemblies.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A head-up display assembly comprising:
    a printed circuit board including a plurality of light emitting elements;
    a display element illuminated by the plurality of light emitting elements;
    a total internal reflection (TIR) lens array including a plurality of TIR lenses arranged in linearly aligned rows and vertically staggered columns, each one of the plurality of TIR lenses includes a first light transmission plane at a light input aperture and a second light transmission plane through which light exits the plurality of TIR lenses, each one of the plurality of TIR lenses is aligned with a different one of the plurality of light emitting elements to reflect and refract light emitted by the plurality of light emitting elements to the display element to illuminate the display element; and
    a plurality of negative lenslets extending across a front side of the TIR lens array at the second light transmission planes of the plurality of TIR lenses, the plurality of negative lenslets configured to facilitate collimation, divergence, and convergence of light emitted by the plurality of light emitting elements.

2. The head-up display assembly of claim 1, wherein the plurality of light emitting elements are light emitting diodes.

3. The head-up display assembly of claim 1, wherein the display element includes a liquid-crystal display.

4. The head-up display assembly of claim 1, wherein the display element is a thin-film-transistor liquid-crystal display.

5. The head-up display assembly of claim 1, wherein each one of the light emitting elements is aligned with the light input aperture of a different one of the plurality of TIR lenses.

6. The head-up display assembly of claim 1, wherein light emitting radiation from each one of the light emitting elements extends into the light input aperture of a different one of the plurality of TIR lenses.

7. The head-up display assembly of claim 1, wherein each one of the plurality of TIR lenses is a tea cup lens.

8. The head-up display assembly of claim 1, wherein each one of the plurality of TIR lenses includes a refractive plane surrounding the light input aperture.

9. The head-up display assembly of claim 8, wherein the first light transmission plane includes sidewalls and a curved surface.

10. The head-up display assembly of claim 9, wherein the curved surface is between the light emitting element at the light input aperture and the second light transmission plane.

11. The head-up display assembly of claim 9, wherein the curved surface is convex relative to the light emitting element at the light input aperture.

12. The head-up display assembly of claim 9, wherein light passing through the curved surface is directed directly to the second light transmission plane without being reflected by the refractive plane.

13. A head-up display assembly comprising:
a printed circuit board including a plurality of light emitting elements;
a display element illuminated by the plurality of light emitting elements; and
a total internal reflection (TIR) lens array including a plurality of TIR lenses arranged in linearly aligned rows and vertically staggered columns;
a light input aperture defined by each one of the plurality of TIR lenses, the light input aperture of each one of the plurality of TIR lenses receives light emitting radiation from a different one of the plurality of light emitting elements to reflect light and illuminate the display element;
each one of the plurality of TIR lenses includes a first light transmission plane at the light input aperture, a refractive plane surrounding the light input aperture and the first light transmission plane, and a second light transmission plane through which light exits the plurality of TIR lenses;
a curved lens included with the first light transmission plane, the curved lens between one of the light emitting elements and the second light transmission plane;
a sidewall included with the first light transmission plane, the sidewall extending about the light input aperture; and
a plurality of negative lenslets extending across a front side of the TIR lens array at the second light transmission planes of the plurality of TIR lenses, the plurality of negative lenslets configured to facilitate collimation, divergence, and convergence of light emitted by the plurality of light emitting elements.

14. The head-up display assembly of claim 13, wherein the TIR lens array collects and collimates light from the light emitting elements.

\* \* \* \* \*